United States Patent
Margetak et al.

[11] Patent Number: 5,615,910
[45] Date of Patent: Apr. 1, 1997

[54] APPARATUS FOR RESTRAINING A DRIVER OF A VEHICLE

[75] Inventors: Glen P. Margetak; Michael E. Heidorn, both of Mesa; Eric W. Wright, Scottsdale, all of Ariz.

[73] Assignee: TRW Inc., Lyndhurst, Ohio

[21] Appl. No.: 572,096

[22] Filed: Dec. 14, 1995

[51] Int. Cl.⁶ ..................................... B60R 21/22
[52] U.S. Cl. .................... 280/731; 280/728.3; 280/728.2
[58] Field of Search ............................... 280/731, 728.2, 280/728.3, 728.1

[56] References Cited

U.S. PATENT DOCUMENTS

| | | |
|---|---|---|
| 3,525,536 | 8/1970 | Pruneski . |
| 3,827,715 | 8/1974 | Lynch . |
| 3,907,330 | 9/1975 | Kondo et al. . |
| 4,828,286 | 5/1989 | Föhl . |
| 4,884,823 | 12/1989 | Honda ................................. 280/731 |
| 4,934,735 | 6/1990 | Embach ............................... 280/731 |
| 4,960,292 | 10/1990 | Sadler . |
| 5,198,629 | 3/1993 | Hayashi et al. . |
| 5,371,333 | 12/1994 | Kanai et al. . |
| 5,415,428 | 5/1995 | Koide et al. . |
| 5,419,585 | 5/1995 | Breed et al. ........................ 280/731 |
| 5,431,438 | 7/1995 | Manabe .............................. 280/731 |
| 5,470,099 | 11/1995 | Williams ............................ 280/728.2 |

FOREIGN PATENT DOCUMENTS

| | | | |
|---|---|---|---|
| 6144762 | 10/1987 | Japan ............................. | 280/731 |
| 1014601 | 10/1991 | United Kingdom ............ | 280/731 |
| 2242871 | 10/1991 | United Kingdom ............ | 280/731 |

*Primary Examiner*—Christopher P. Ellis
*Attorney, Agent, or Firm*—Tarolli, Sundheim, Covell, Tummino & Szabo

[57] ABSTRACT

A vehicle occupant restraint apparatus (10) includes a vehicle steering wheel unit (12) for use with a vehicle steering column (14). The steering wheel unit (12) has parts which are interconnected separately from the steering column (14). The interconnected parts of the steering wheel unit (12) include a steering wheel structure (40,190), an inflatable vehicle occupant restraint (22), an inflator housing (160), and a cover (30) for covering the restraint (22) and the inflator housing (160) on the steering wheel structure (40, 190). The steering wheel structure (40,190) includes a rim (42), at least one spoke (44), and a hub plate (190) which supports the rim (42) and the spoke (44) for rotation about an axis (45). The hub plate (190) further functions as a reaction plate for supporting the inflator housing (160) on the steering wheel structure (40). The cover (30) includes inner and outer cover parts (56,58) which respectively include inner and outer deployment door layers (80,82; 90,92) extending over the restraint. Each of the cover parts (56,58) is connected directly to the steering wheel structure (40,190).

25 Claims, 8 Drawing Sheets

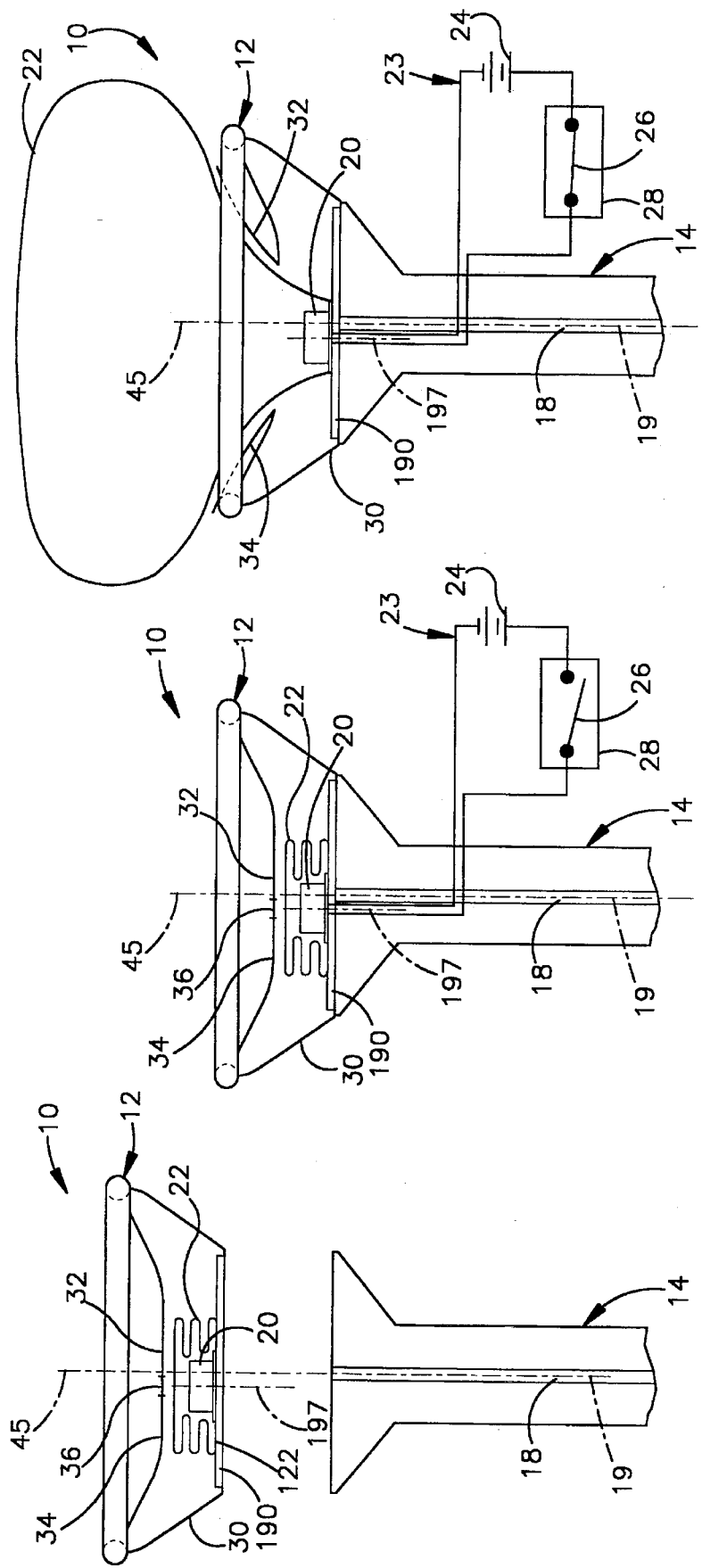

5,615,910

APPARATUS FOR RESTRAINING A DRIVER OF A VEHICLE

FIELD OF THE INVENTION

The present invention relates to a vehicle occupant restraint apparatus for restraining a driver of a vehicle, and particularly relates to a vehicle occupant restraint apparatus for use with a vehicle steering column.

BACKGROUND OF THE INVENTION

An inflatable vehicle occupant restraint, such as an air bag, is inflated to protect an occupant of a vehicle upon the occurrence of a vehicle collision. The air bag is part of a vehicle occupant restraint system which further includes a collision sensor and an inflator. The collision sensor senses vehicle conditions which indicate the occurrence of a collision. When the collision sensor senses a collision-indicating condition of at least a predetermined threshold level, the inflator is actuated. The inflator then emits inflation fluid which inflates the air bag into the vehicle occupant compartment to restrain an occupant of the vehicle from forcefully striking parts of the vehicle as a result of the collision.

An air bag and an inflator are typically assembled together as parts of an air bag module which is separate from the collision sensor. In addition to the air bag and the inflator, the module includes a deployment door or cover which extends over the air bag and the inflator to conceal those parts of the module from the vehicle occupant compartment. As the inflation fluid emitted from the inflator begins to inflate the air bag, it moves the air bag forcefully outward against the deployment door. The deployment door is ruptured by the force of the fluid pressure in the air bag, and is moved out of the path of the air bag as the inflation fluid continues to inflate the air bag outward into the vehicle occupant compartment.

An air bag module is located in the vehicle adjacent to the vehicle occupant compartment, such as in the instrument panel or on the steering column. When the module is located on the steering column, it is attached to the steering wheel on the steering column.

SUMMARY OF THE INVENTION

In accordance with the present invention, a vehicle occupant restraint apparatus for use with a vehicle steering column comprises a steering wheel unit. The steering wheel unit comprises a plurality of parts which are interconnected separately from the steering column. The parts of the steering wheel unit include a vehicle steering wheel structure, an inflatable vehicle occupant restraint, and an inflator housing. The parts of the steering wheel unit further include cover means for covering the restraint and the inflator housing on the steering wheel structure.

The steering wheel structure includes a rim, at least one spoke, and a hub plate which comprises means for supporting the rim and the spoke for rotation about an axis. The hub plate further comprises reaction plate means for supporting the inflator housing on the steering wheel structure.

The cover means comprises inner and outer cover parts which respectively include inner and outer deployment door layers extending over the restraint. Each of the cover parts is connected directly to the steering wheel structure.

In a first embodiment of the present invention, the inner cover part has a connector portion projecting away from the outer cover part. The connector portion of the inner cover part is fastened directly to the hub plate by fasteners. In a second embodiment of the present invention, the inner cover part and the steering wheel structure together comprise means for snapping into a locked condition to establish a mechanical interlock between the inner cover part and the steering wheel structure.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant restraint apparatus comprising a first embodiment of the present invention, with the apparatus being shown in a partially assembled condition;

FIG. 2 is a view showing the apparatus of FIG. 1 in an assembled condition;

FIG. 3 is a view showing the apparatus of FIG. 2 in an actuated condition;

DESCRIPTION OF PREFERRED EMBODIMENTS

Figure 4:
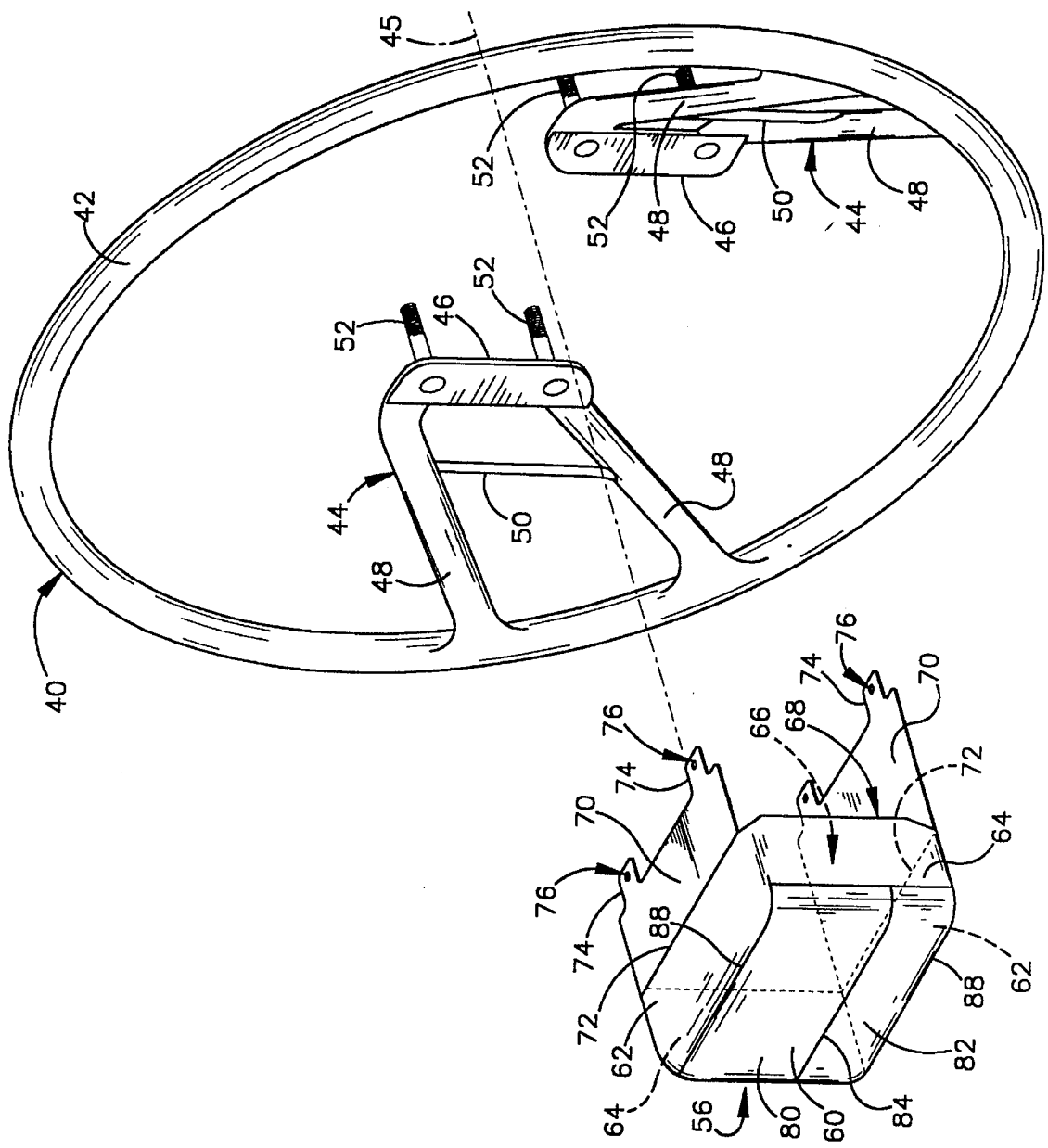
FIG. 4 is a perspective view showing parts of the apparatus of FIG. 1 in a partially assembled condition.

A vehicle occupant restraint apparatus 10 comprising a first embodiment of the present invention is shown schematically in FIGS. 1–3. The apparatus 10 includes a vehicle steering wheel unit 12 and a vehicle steering column 14. The steering wheel unit 12 is an assembled unit of parts which are interconnected separately from the steering column 14, as shown in FIG. 1. As shown in FIG. 2, the steering wheel unit 12 is installed on the steering column 14. The steering wheel unit 12 is then coupled to a steering shaft 18 in the steering column 14 for rotation about an axis 19 with the shaft 18.

The parts of the steering wheel unit 12 include an inflator 20 and a particular type of inflatable vehicle occupant restraint 22 which is commonly referred to as an air bag. The air bag 22 is inflatable from a folded, uninflated condition, as shown in FIGS. 1 and 2, to an unfolded, inflated condition, as shown in FIG. 3. When the air bag 22 is being inflated, it moves toward the driver of the vehicle. The air bag 22 then restrains movement of the driver toward the steering wheel unit 12 to help protect the driver from a forceful impact with the steering wheel unit 12 or other parts of the vehicle.

The inflator 20 is an electrically actuatable source of inflation fluid for inflating the air bag 22. In the preferred embodiments of the present invention, the inflator 20 contains an ignitable gas generating material for generating a large volume of gas. The inflator 20 may alternatively contain a stored quantity of pressurized inflation fluid, or a combination of pressurized inflation fluid and ignitable material for heating the inflation fluid.

When the steering wheel unit 12 is installed on the steering column 14, as shown in FIG. 2, the inflator 20 is included in an electrical circuit 23. The electrical circuit 23 further includes a power source 24 and a normally open switch 26. The power source 24 is preferably the vehicle battery. The switch 26 is part of a sensor 28 which senses a condition indicating the occurrence of a vehicle collision. Such a condition may comprise, for example, sudden vehicle deceleration caused by a collision. If the collision-indicating condition is above a predetermined threshold level, it indicates the occurrence of a collision for which inflation of the air bag 22 is desired to restrain movement of the driver of the vehicle, as described above. The sensor 28 then closes the switch 26, and electric current is directed through the inflator 20 to actuate the inflator 20. As a result, the inflator 20 rapidly emits a large volume of inflation fluid which flows into the air bag 22 to inflate the air bag 22.

Another part of the steering wheel unit 12 is a cover 30 which encloses the air bag 22 and the inflator 20. The cover 30 includes first and second deployment door panels 32 and 34 which extend over the air bag 22. The deployment door panels 32 and 34 are held in closed positions, as shown in FIGS. 1 and 2, by a rupturable section 36 of the cover 30. As the inflation fluid emitted from the inflator 20 begins to inflate the air bag 22, it moves the air bag 22 forcefully outward against the cover 30. The air bag 22 then ruptures the rupturable section 36 of the cover 30 and moves the deployment door panels 32 and 34 pivotally outward, as shown in FIG. 3. As the inflation fluid continues to inflate the air bag 22, it moves the air bag 22 outward from the cover 30 past the deployment door panels 32 and 34.

Figure 5:
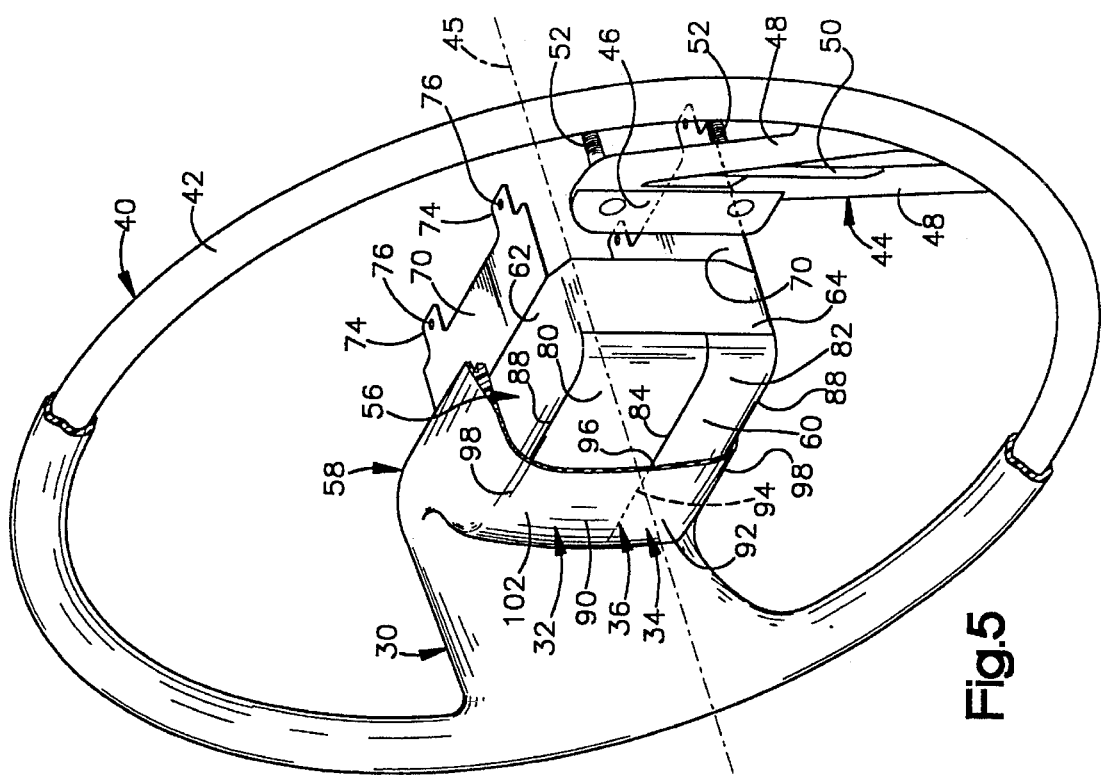
FIG. 5 also is a perspective view showing parts of the apparatus of FIG. 1 in a partially assembled condition.

As shown in greater detail in FIGS. 4 and 5, the parts of the steering wheel unit 12 further include a steering wheel armature 40. The armature 40 is a metal structure with a rim 42 and spokes 44. The rim 42 has an axis of rotation 45. The spokes 44 extend equal distances from the rim 42 in generally radial directions, and also extend equal distances from the rim 42 in an axially inward direction, i.e., in a direction extending along the axis 45 from left to right as viewed in FIGS. 4 and 5.

Each spoke 44 includes a mounting tab 46 at its inner end. Each spoke 44 further includes a pair of spoke arms 48 which converge toward the corresponding mounting tab 46, and a stiffener 50 which extends between the spoke arms 48. A corresponding pair of threaded mounting studs 52 project axially inward from each mounting tab 46. The armature 40 is preferably made of magnesium or aluminum, but can be made of any other suitable metal or other material known in the art.

As shown with the armature 40 in FIG. 5, the cover 30 includes inner and outer cover parts 56 and 58. The inner cover part 56 in the first embodiment of the present invention has a non-woven structure defined by a continuous body of molded plastic material. The plastic material of which the inner cover part 56 is formed may have any suitable composition known in the art, but a thermoplastic material is preferred. As shown separately in FIG. 4, the inner cover part 56 has the configuration of a generally rectangular box with a base wall 60, a pair of opposite side walls 62, and a pair of opposite end walls 64. The walls 60–64 of the inner cover part 56 together define a compartment 66 with an opening 68 opposite the base wall 60.

The inner cover part 56 further has a pair of connector flaps 70. Each connector flap 70 projects from a corresponding side wall 62, and is pivotal about a corresponding fold line 72 at the juncture of the connector flap 70 and the side wall 62. Additionally, each connector flap 70 has a pair of connector tabs 74 with a corresponding pair of apertures 76.

The base wall 60 of the inner cover part 56 has first and second pivotal deployment door portions 80 and 82. The deployment door portions 80 and 82 of the base wall 60 have generally rectangular shapes, with the first deployment door portion 80 being somewhat larger than the second deployment door portion 82. The first deployment door portion 80 of the base wall 60 defines an inner layer of the first deployment door panel 32 (FIGS. 1–3). The second deployment door portion 82 of the base wall 60 defines an inner layer of the second deployment door panel 34.

The boundaries of the deployment door portions 80 and 82 are defined by a stress riser 84 and a pair of hinges 88. In the preferred embodiments of the present invention, the stress riser 84 has an H-shaped configuration extending along three sides of each of the two deployment door portions 80 and 82. As known in the art, the stress riser 84 has a structure defined by a thinned or notched section of the plastic material of the inner cover part 56. Each hinge 88 extends along the fourth side of the corresponding deployment door portion 80 or 82, and is defined by the plastic material at the juncture of the base wall 60 and the adjacent side wall 62. The hinges 88 also may have relatively thin structures so that the plastic material at the hinges 88 will bend more easily than the plastic material adjacent to the hinges 88. Such hinge structures also are known in the art.

Figure 6:
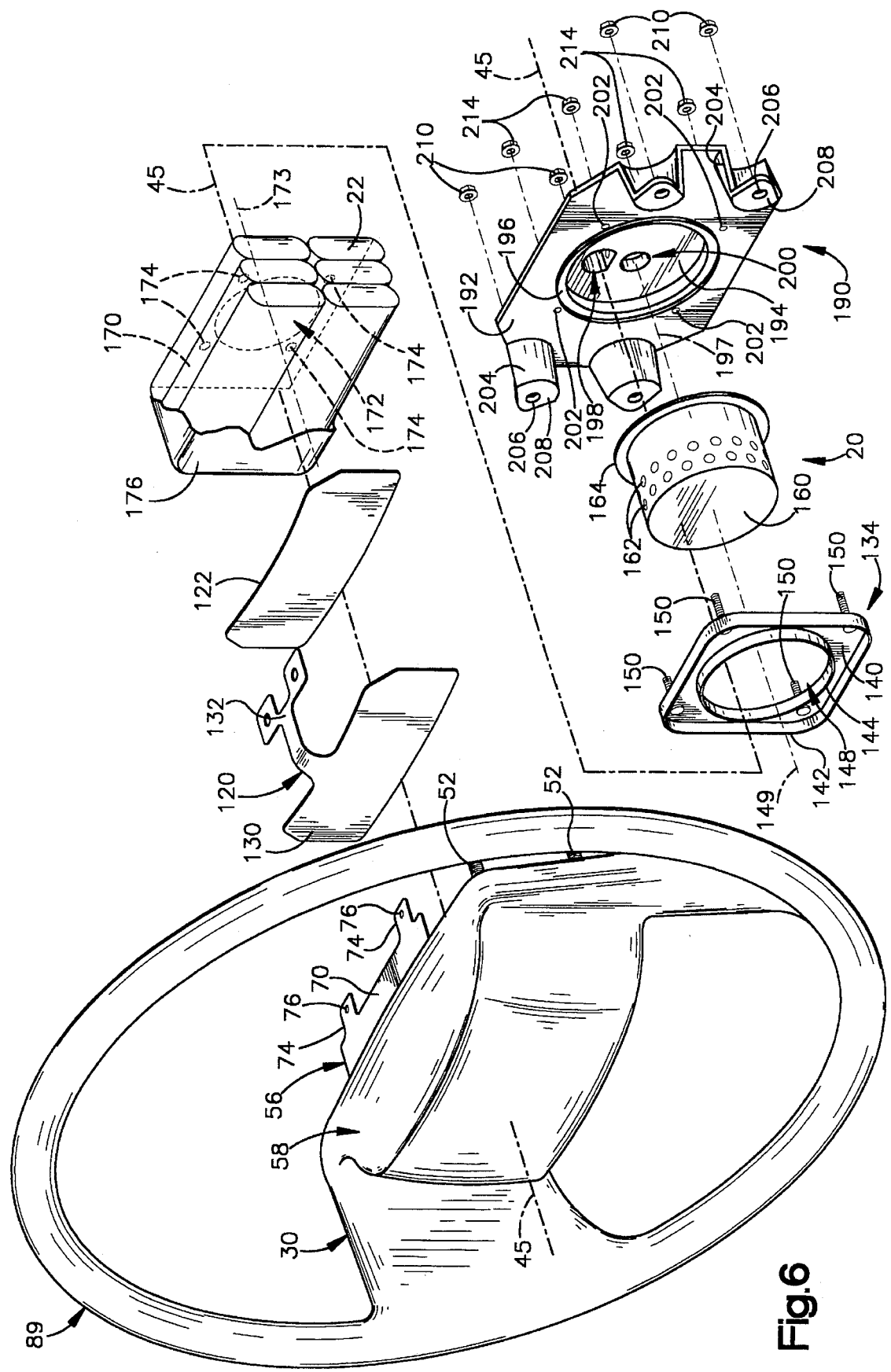
FIG. 6 is an exploded perspective view showing the parts of FIG. 5 along with other parts of the apparatus of FIG. 1.

The armature 40 and the cover parts 56 and 58 are shown in their interconnected relationship in FIGS. 5 and 6. Those interconnected parts of the steering wheel unit 12 define a steering wheel subassembly 89. In the subassembly 89, the outer cover part 58 extends over the armature 40 and the inner cover part 56 to conceal them from view from above and beside the steering column 14 (FIGS. 2 and 3). Specifically, the outer cover part 58 extends continuously along and around the rim 42 of the armature 40, along and around the arms 48 and the stiffeners 50 at the spokes 44, and fully over the exterior surfaces of the walls 60–64 of the inner cover part 56. However, the outer cover part 58 does not extend over the inner sides of the mounting tabs 46 where the studs 52 project from the mounting tabs 46, and does not extend over the connector flaps 70. The studs 52 and the connector flaps 70 project axially inward from the outer cover part 58 for connection directly with other parts of the steering wheel unit 12.

Preferably, the subassembly 89 is formed by first placing the armature 40 and the inner cover part 56 together in a mold cavity having the size and shape of the subassembly 89. The outer cover part 58 is then formed over the armature 40 and the inner cover part 56 upon injection of a plastic material into the mold cavity. Such plastic material may be either thermoplastic or thermosetting, and may have any suitable composition known in the art. The outer cover part 58 is thus constructed as a continuous body of molded plastic material, as shown in FIG. 6.

When the outer cover part 58 is formed over the inner cover part 56 in the foregoing manner, the plastic material of the outer cover part 58 becomes bonded to the plastic material of the inner cover part 56 at the exterior surfaces of the walls 60–64. The outer cover part 58 then supports the inner cover part 56 at a location between the mounting tabs 46 at the inner ends of the spokes 44, with the compartment opening 68 facing inward along the axis 45 of the rim 42.

Like the inner cover part 56, the outer cover part 58 has first and second pivotal deployment door portions 90 and 92. The first deployment door portion 90 of the outer cover part 58 overlies the first deployment door portion 80 of the inner cover part 56. The first deployment door portion 90 of the outer cover part 58 thus defines an outer layer of the first deployment door panel 32 (FIGS. 1–3). In the same manner, the second deployment door portion 92 of the outer cover part 58 overlies the second deployment door portion 82 of the inner cover part 56, and defines an outer layer of the second deployment door panel 34.

An H-shaped stress riser 94 in the outer cover part 58 extends along three sides of each of the two deployment door portions 90 and 92 between the opposite ends of a corresponding pair of hinges 98. The stress riser 94 and the hinges 98 in the outer cover part 58 adjoin, and are substantially coextensive with, the stress riser 84 and the hinges 88 in the inner cover part 56. The adjoining stress risers 84 and 94 together define the rupturable section 36 (FIGS. 1 and 2) of the cover 30. Preferably, the structure of the stress riser 94 in the outer cover part 58 does not affect the contour of an adjacent outer side surface 102 of the outer cover part 58. The outer side surface 102 thus extends continuously over the rupturable section 36 of the cover 30 such that the outline of the deployment door panels 32 and 34 is not visible at the outer side surface 102.

Other parts of the steering wheel unit 12 also are shown in FIG. 6. These include a horn actuator 120 and a backing plate 122 for the horn actuator 120. The horn actuator 120 comprise a switch panel 130 with approximately the same size and shape as the first deployment door panel 32 on the cover 30. The switch panel 130 is a membrane switch of known construction, and thus includes electrical contact members that are pressed against each other to complete an electrical circuit upon compression of the switch panel 130 across its thickness. A terminal portion 132 of the horn actuator 120 projects from the switch panel 130 for connection in an electrical circuit with the vehicle horn (not shown). As described fully below, the backing plate 122 supports the switch panel 130 against the base wall 60 of the inner cover part 56 when the steering wheel unit 12 has been fully assembled.

The parts of the steering wheel unit 12 shown in FIG. 6 further include the inflator 20, the air bag 22, and a retainer 134 for the inflator 20 and the air bag 22. The retainer 134 includes a planar frame 140. The frame 140 has a square peripheral shape with rounded corners. An outer flange 142 projects from the periphery of the frame 140 in a direction extending axially outward, as shown with reference to the axis 45 of the armature rim 42. An inner flange 144 also projects axially outward from the frame 140, and defines a circular central opening 148 through the retainer 134. The opening 148 is centered on an axis 149 which is offset from the axis 45 of the armature rim 42. Four threaded mounting studs 150 project axially inward from the frame 140, with each stud 150 being located adjacent to a corresponding one of the four rounded corners of the frame 140.

The inflator 20 has a cylindrical housing 160. The housing 160 is coaxial with the opening 148 in the retainer 134, and has a diameter that is just slightly less than the diameter of the opening 148. A circumferentially extending array of gas outlet openings 162 is located near one end of the housing 160. An annular mounting flange 164 projects radially outward from the other end of the housing 160.

The air bag 22 is shown in FIG. 6 in the folded, uninflated condition described above with reference to FIGS. 1 and 2. An edge portion 170 of the air bag 22 defines a circular inlet opening 172 which is located at the axially inner side of the air bag 22, as shown with reference to the axis 45 of the armature rim 42. The inlet opening 172 in the air bag 22 has a central axis 173 which, like the axis 149 of the retainer opening 148, is offset from the axis 45.

Although the retainer 134 is shown in FIG. 6 separately from the air bag 22, those skilled in the art understand that the retainer 134 is inserted through the inlet opening 172 in the air bag 22 before the air bag 22 is folded. When the retainer 134 is thus installed in the air bag 22, the mounting studs 150 on the retainer 134 are received through corresponding apertures 174 in the edge portion 170 of the air bag 22 so as to project axially away from the air bag 22. An air bag cover 176 is wrapped around the air bag 22 to hold the air bag 22 in its folded configuration, and also to protect the folded air bag 22 from the ambient atmosphere. The air bag cover 176 is preferably formed of a thin, rupturable plastic material, as known in the art.

As shown schematically in FIGS. 2 and 3, a hub plate 190 supports the other parts of the steering wheel unit 12 on the steering shaft 18. As shown in detail in FIG. 6, the hub plate 190 has a planar outer side surface 192. The outer side surface 192 is perpendicular to the axis 45 of the armature rim 42, and faces axially outward. A planar surface 194 with a circular shape is parallel to, and recessed axially from, the outer side surface 192. An annular shoulder surface 196 also is parallel to the outer side surface 192, and is located axially between the circular surface 194 and the outer side surface 192. The shoulder surface 196 and the circular surface 194 are centered on an axis 197 which also is offset from the axis 45.

A bore 198 extends through the hub plate 192 along the axis 45. An opening 200 extends through the hub plate 192 along the axis 197. A first group of apertures 202 also extend through the hub plate 190. The apertures 202 are located radially outward of the shoulder surface 196 in axial alignment with the mounting studs 150 on the retainer 134. Additionally, four mounting bosses 204 project axially outward from the periphery of the outer side surface 192. A second group of apertures 206 are located at the outer ends 208 of the mounting bosses 204. The apertures 206 in the mounting bosses 204 are aligned axially with the mounting studs 52 on the armature 40.

Figure 7:
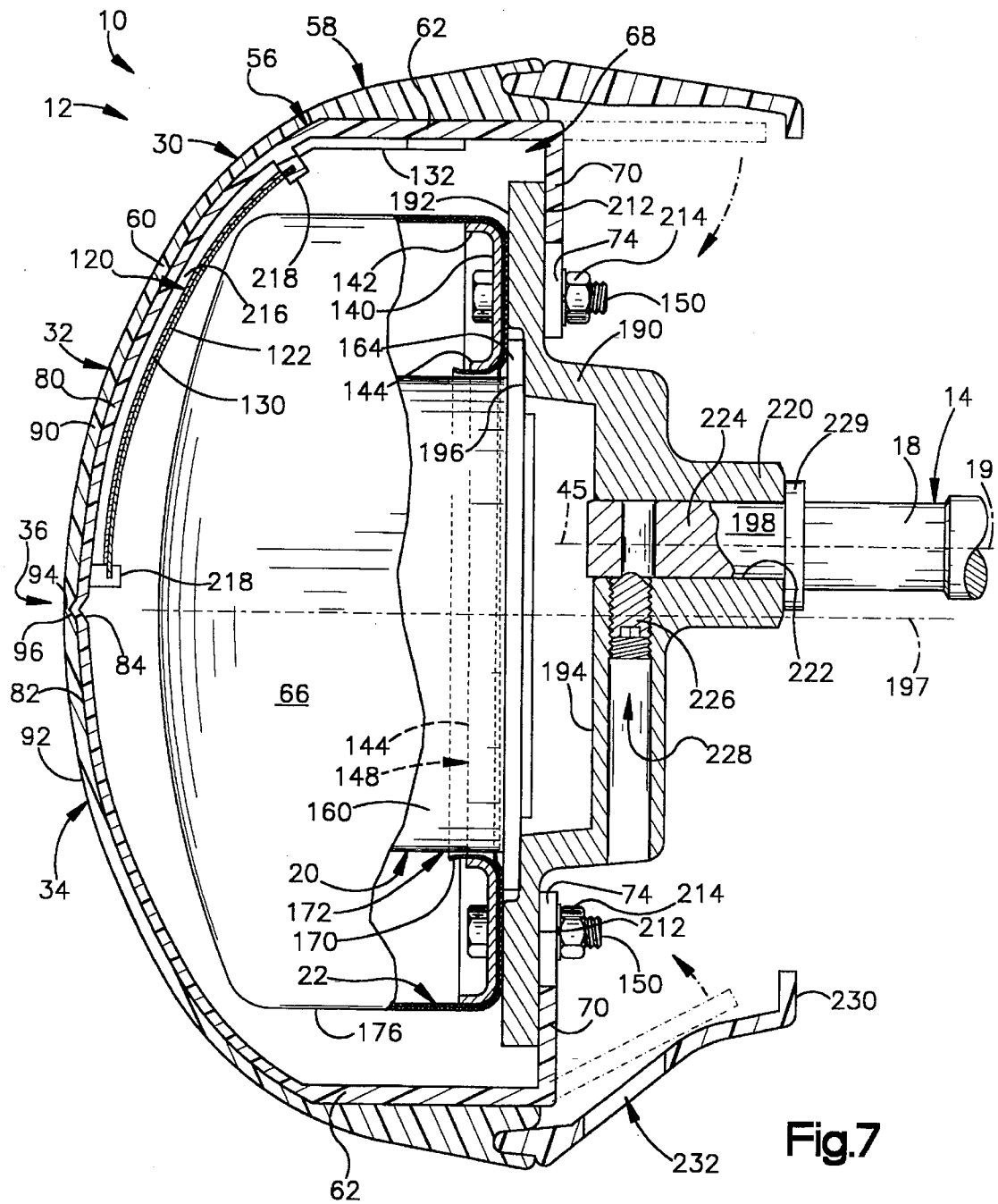
FIG. 7 is a side view, partly in section, of parts of the apparatus of FIG. 1.

When the steering wheel subassembly 89 has been assembled, as described above, the other parts of the steering wheel unit 12 are interconnected with the subassembly 89 in the axial alignment in which they are shown in FIGS. 6 and 7. The horn actuator 120 and the backing plate 122 are first moved into the compartment 66 (FIG. 5) in the inner cover part 56 through the opening 68. The base wall 60 of the inner cover part 56 has a plurality of ribs 216, one of which is shown in FIG. 7, and has a pair of supporting structures 218 extending across the opposite ends of the ribs 216. The switch panel 130 is received against the ribs 216. The backing plate 122 is held against the switch panel 130 by the supporting structures 218, and thus holds the switch panel 130 against the ribs 216. Alternatively, the switch panel 130 could be fastened directly to the ribs 216, or to other portions of the base wall 60, by heat staking, sonic welding, or the like. The switch panel 130 is thus supported for compression across its thickness between the ribs 216 and the backing plate 122 upon the application of pressure against the cover 30 by an occupant of the vehicle. The terminal portion 132 of the horn actuator 120 can be connected in an electrical circuit, as noted above, in any suitable manner known in the art.

Next, the air bag 22, the retainer 134, and the inflator 20 are placed together on the hub plate 190. As shown in the side view of FIG. 7, the inflator housing 160 is received coaxially through the inlet opening 172 at the edge portion 170 of the air bag 22. The inflator housing 160 is thus received coaxially through the opening 148 in the retainer 134. The mounting flange 164 on the inflator 20, which then projects radially outward of the inlet opening 172, is moved axially into abutment with the shoulder surface 196 on the hub plate 190. The mounting studs 150 on the retainer 134 are simultaneously received through the apertures 202 at the outer side surface 192 of the hub plate 190. The hub plate 190 is then moved axially against the subassembly 89 (FIG. 6). The outer ends 208 of the mounting bosses 204 are moved into abutment with the tabs 46 (FIG. 4) on the spokes 44, with the studs 52 being received through the corresponding apertures 206. A corresponding plurality of nuts 210 are received over the studs 52 to fasten the hub plate 190 directly to the armature 40.

When the hub plate 190 is moved into engagement with the subassembly 89 in the foregoing manner, the inflator 20 and the air bag 22 are carried by the hub plate 190 into the compartment 66 through the opening 68. As indicated by the arrows shown in FIG. 7, the mounting flaps 70 on the inner cover part 56 are moved pivotally into abutting engagement with the hub plate 190 at an inner side surface 212 opposite the outer side surface 192. The studs 150 projecting axially inward from the hub plate 190 are then received through the apertures 76 in the mounting flaps 70. Four corresponding nuts 214 are received over the studs 150 to fasten the mounting flaps 70 directly to the hub plate 190.

In the interconnected arrangement of FIG. 7, the edge portion 170 of the air bag 22 is clamped between the frame portion 140 of the retainer 134 and the outer side surface 192 of the hub plate 190. The flange 164 on the inflator 20 is similarly clamped between the frame portion 140 of the retainer 134 and the shoulder surface 196 of the hub plate 190. The hub plate 190 thus functions as a reaction plate which directly engages the inflator 20 to help secure the inflator 20 against movement under a thrust, if any, developed by the gas emerging from the outlet openings 162. The opening 200 (FIG. 6) in the hub plate 190 provides access for connection of the inflator 20 in the electrical circuit 23 shown in FIGS. 2 and 3.

As further shown in FIG. 7, the hub plate 190 has a neck 220 which projects axially away from the inner side surface 212 and through which the bore 198 extends along the axis 45. The neck 220 has a flat surface 222 at one side of the bore 198, and is thus shaped to receive a mating end portion 224 of the steering shaft 18. A set screw 226 is supported in a radially extending bore 228 in the neck 220 of the hub plate 190, and is movable into the axially extending bore 198. When the set screw 226 is moved into the bore 198, it engages the end portion 224 of the steering shaft 18 so as to press the neck 220 axially against an adjacent flange 229 on the steering shaft 18. The set screw 226 then holds the steering wheel unit 12 securely on the steering shaft 18.

A skirt portion 230 of the cover 30 is shown in FIG. 7. The skirt portion 230 projects axially inward from the outer cover part 58, and extends entirely around the axis 45. An access opening 232 in the skirt portion 230 is aligned with the radially extending bore 228 in the hub plate 190 to provide access to the set screw 226 and the steering shaft 18 from a location beside the steering wheel unit 12. Importantly, in accordance with the present invention, such access is provided radially from beside the steering wheel unit 12 rather than axially from the front of the steering wheel unit 12. This is because the set screw 226 is moved radially into engagement with the steering shaft 18 after the axially outer end 232 of the steering shaft 18 has been covered by the fully assembled steering wheel unit 12.

Figure 9:
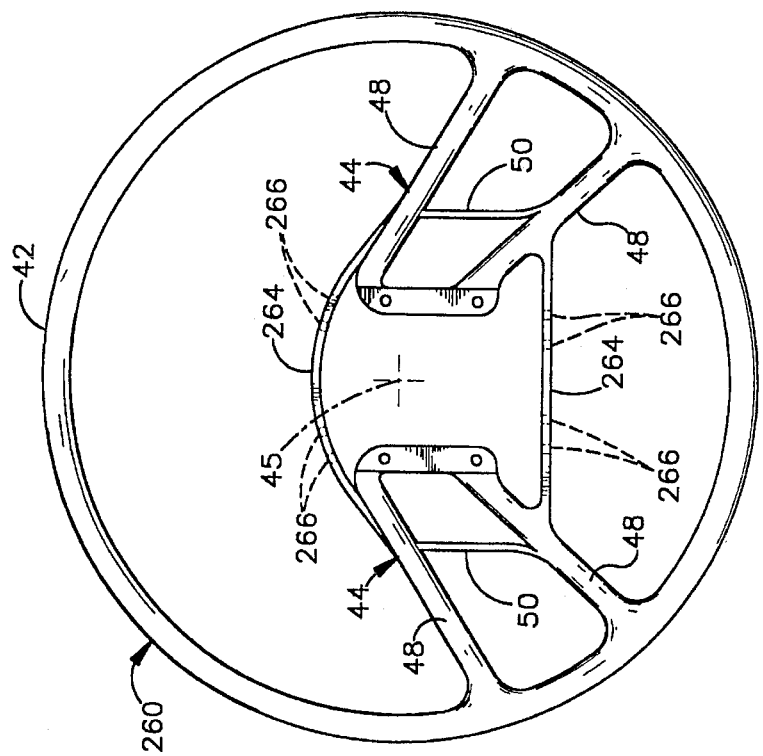
FIG. 9 is a front view of a part of the apparatus of FIG. 8.
Figure 8:
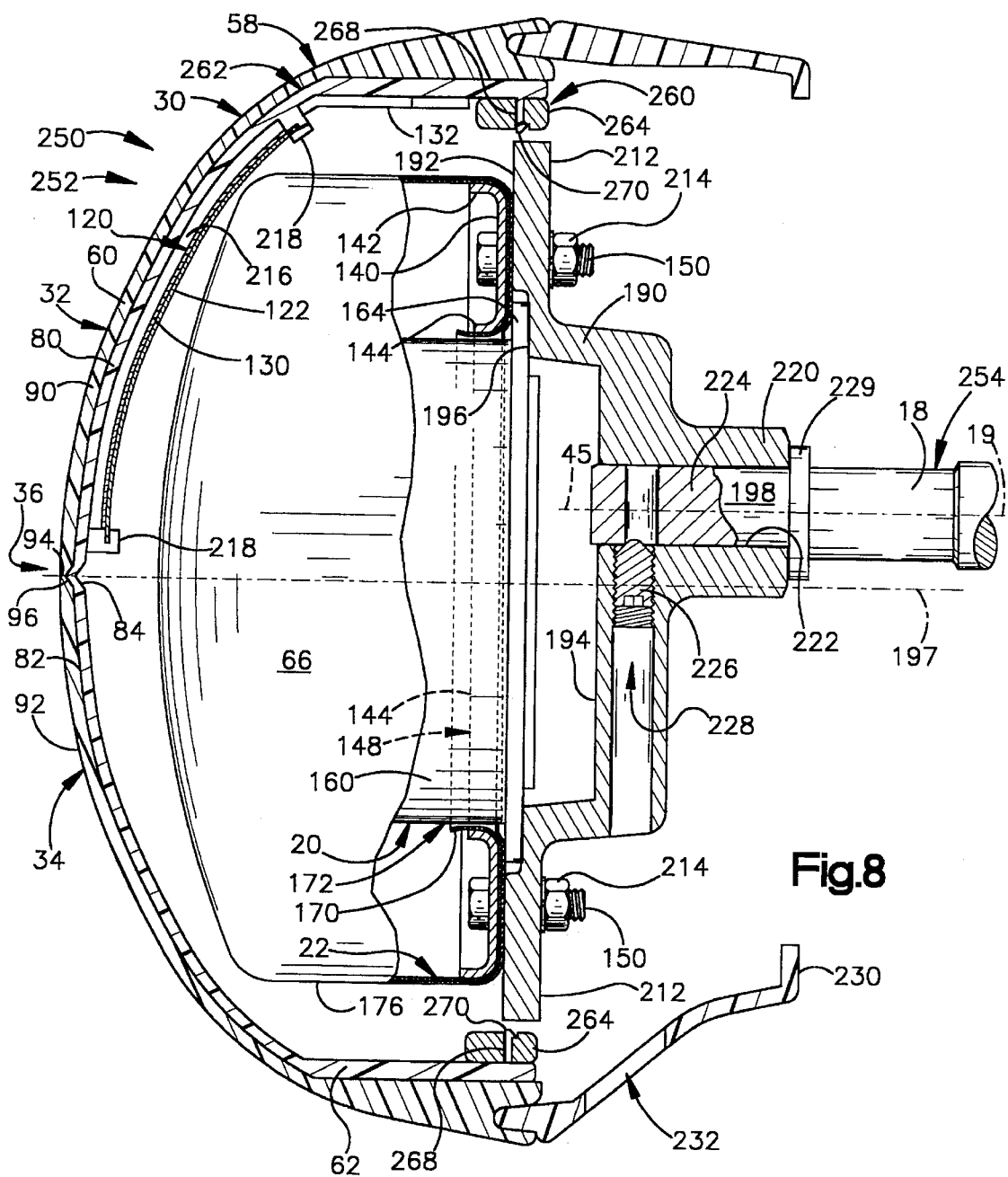
FIG. 8 is a side view, similar to FIG. 7, showing parts of a vehicle occupant restraint apparatus comprising a second embodiment of the present invention.

A vehicle occupant restraint apparatus 250 comprising a second embodiment of the present invention is shown partially in FIGS. 8 and 9. The partial view of the apparatus 250 shown in FIG. 8 corresponds with the partial view of the apparatus 10 shown in FIG. 7. The apparatus 250 is thus shown to include a steering wheel unit 252 which is installed on a steering column 254 after being assembled separately from the steering column 254.

As indicated by the use of the same reference numbers in FIGS. 8 and 7, the steering column 254 is substantially the same as the steering column 14. Likewise, the steering wheel unit 252 has many parts that are substantially the same as corresponding parts of the steering wheel unit 12. However, the steering wheel unit 252 has other parts that differ from the corresponding parts of the steering wheel unit 12. The differing parts of the steering wheel unit 252 include a steering wheel armature 260 and an inner cover part 262.

As shown separately in FIG. 9, the armature 260 differs from the armature 40 in that the armature 260 has a pair of bridge arms 264 extending between the spokes 44. Each bridge arm 264 has a plurality of locking apertures 266.

As shown in FIG. 8 with other parts of the steering wheel unit 252, the inner cover part 262 does not have mounting flaps like the mounting flaps 70 on the inner cover part 56. Instead, the side walls 62 of the inner cover part 262 have locking pins 268 with wedge-shaped end portions 270. The end portions 270 of the locking pins 268 snap into engagement with the bridge arms 264 to establish a mechanical interlock between the inner cover part 262 and the armature 260 upon movement of the locking pins 268 through the apertures 266.

Figure 10:
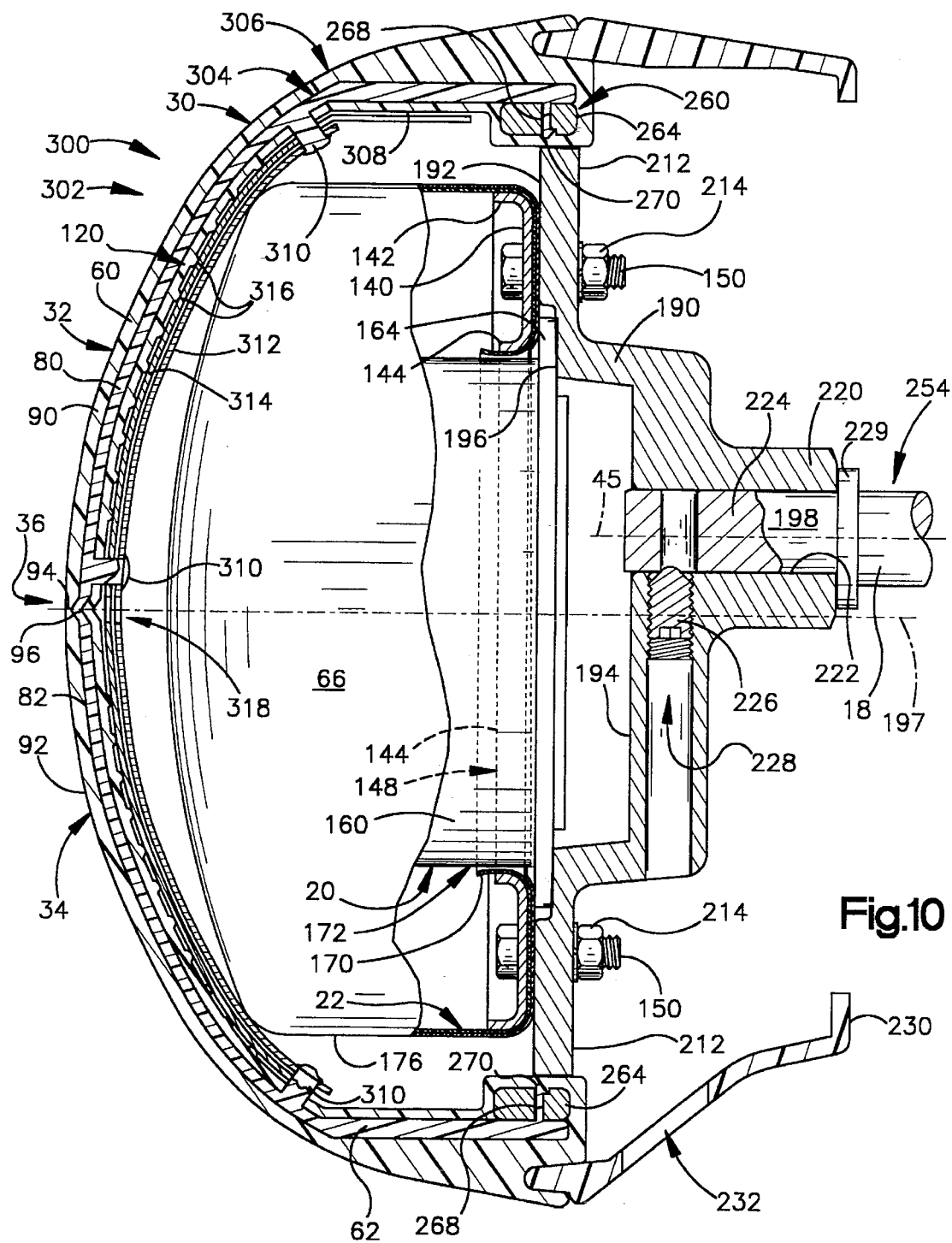
FIG. 10 is a side view, similar to FIG. 8, showing parts of a vehicle occupant restraint apparatus comprising a third embodiment of the present invention.

A vehicle occupant restraint apparatus 300 comprising a third embodiment of the present invention is shown partially in FIG. 10. The apparatus 300 of FIG. 10 is substantially similar to the apparatus 250 of FIG. 8. This is indicated by the use of the same reference numbers in FIGS. 8 and 10 for parts that are substantially the same in the second and third embodiments. The apparatus 300 differs from the apparatus 250 in that the apparatus 300 includes a steering wheel unit 302 with differently constructed inner and outer cover parts 304 and 306.

The inner cover part 304 in the third embodiment is interlocked with the bridge arms 264 on the armature 260 in the same manner as described above with reference to the inner cover part 262 in the second embodiment. However, the outer cover part 306 in the third embodiment has a wraparound portion 308 extending around the bridge arms 264 and across the inner side of the inner cover part 304. A plurality of mounting studs 310 on the inner cover part 304 project inward through the wraparound portion 308 of the outer cover part 306. The inner cover part 304 is otherwise substantially encapsulated within the outer cover part 306.

The mounting studs 310 further project through a backing plate 312, and are heat staked or welded to the backing plate 312. In this arrangement, the mounting studs 310 and the backing plate 312 hold a switch panel 314 against a plurality of ribs 316 on the wraparound portion 308 of the outer cover part 306. Like the switch panel 130 described above, the switch panel 314 is a membrane switch for actuation of a vehicle horn, and includes electrical contact members that are pressed against each other to complete an electrical circuit upon compression of the switch panel 314 between the ribs 316 and the backing plate 312.

As further shown in FIG. 10, the switch panel 314 and the backing plate 312 extend fully across the deployment door panels 32 and 34 and the rupturable portion 36 of the cover 30. A plurality of apertures 318 are provided in the switch panel 314 and the backing plate 312 for rupturing of those parts adjacent to the rupturable portion 316 of the cover 30 upon deployment of the air bag 22.

Figure 11:
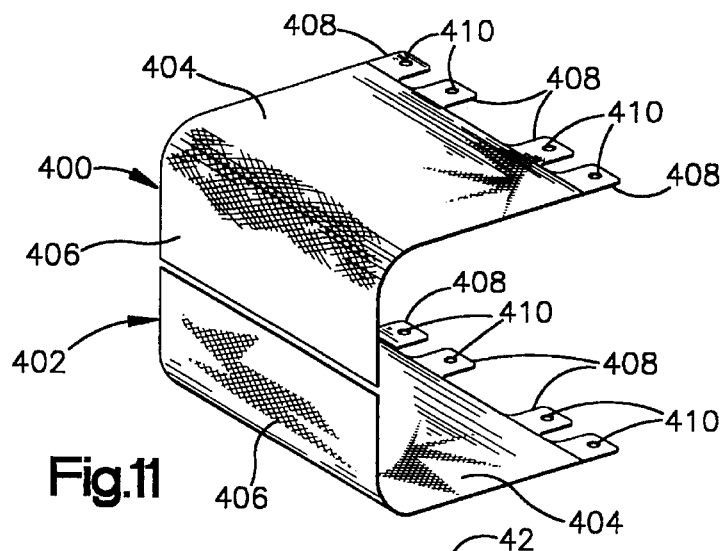
FIG. 11 is a perspective view of parts of a vehicle occupant restraint apparatus comprising a fourth embodiment of the present invention.
Figure 12:
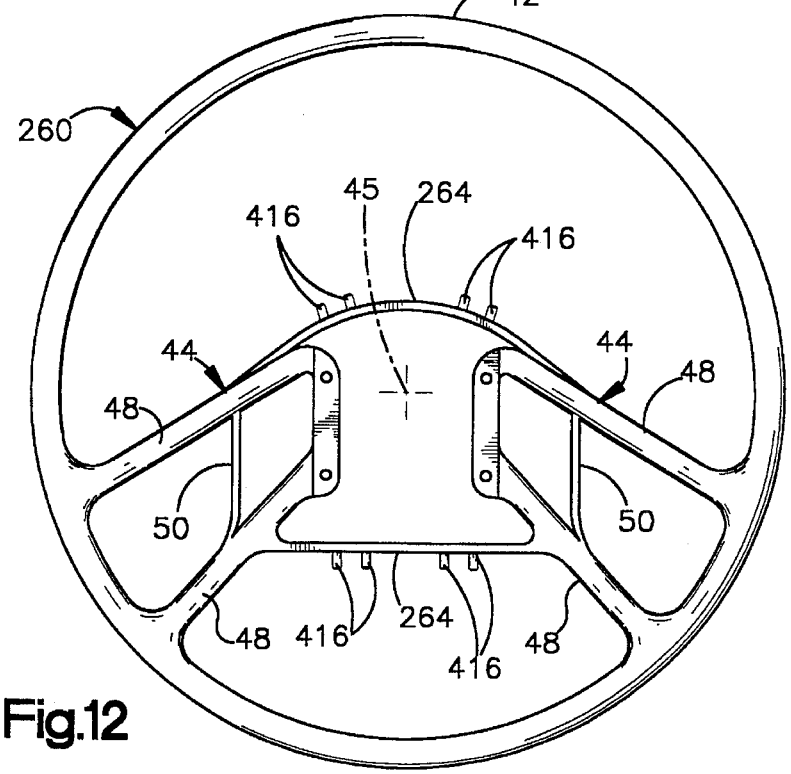
FIG. 12 is a front view, similar to FIG. 9, of another part of the fourth embodiment of the present invention.

Parts of a fourth embodiment of the present invention are shown in FIGS. 11 and 12. As shown in FIG. 11, the fourth embodiment includes a pair of inner cover parts 400 and 402. The inner cover parts 400 and 402 together define a structure which is similar to the inner cover parts 56, 262, and 304 described above.

Each of the inner cover parts 400 and 402 includes a scrim 404 with a pivotal deployment door portion 406. The woven threads of which the scrims 404 are constructed may be formed of any suitable material known in the art, such as nylon. Each of the inner cover parts 400 and 402 further includes a plurality of mounting tabs 408 with a corresponding plurality of apertures 410. The mounting tabs 408 are preferably formed of metal, and are fixed to the scrims 404 by an adhesive or the like.

As shown in FIG. 12, the fourth embodiment of the present invention further includes a steering wheel armature 414. The armature 414 of FIG. 12 differs from the armature 260 of FIG. 9 in that the armature 414 has locking pins 416 in place of the apertures 266. The locking pins 416 are receivable through the apertures 410 (FIG. 11) in the mounting tabs 408 in the same manner that the locking pins 268 (FIG. 8) are receivable through the apertures 266. Accordingly, the inner cover parts 400 and 402 are interlocked with the armature 414 in substantially the same manner that the inner cover part 262 is interlocked with the armature 260. A subassembly similar to the subassembly 89 (FIGS. 5 and 6) can be formed by injecting a plastic material into a mold cavity containing the armature 414 and the inner cover parts 400 and 402 so as to form an outer cover part (not shown) over the armature 414 and the inner cover parts 400 and 402.

Figure 13:
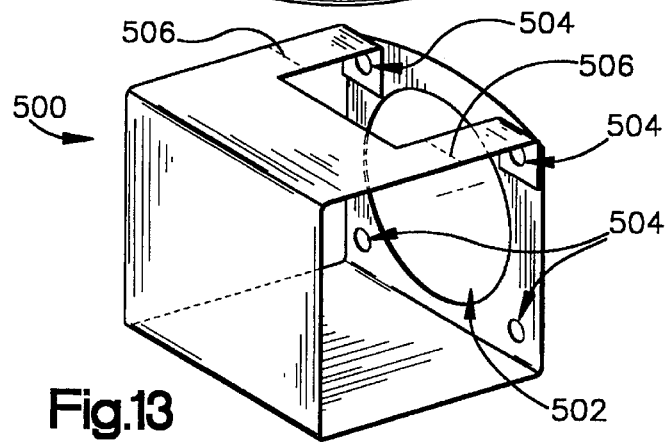
FIG. 13 is a perspective view of a part of a vehicle occupant restraint apparatus comprising a fifth embodiment of the present invention.

A fifth embodiment of the present invention includes a tether structure 500 (FIG. 13) which is wrapped around the folded air bag 22 in place of the air bag cover 176 (FIG. 6). When the tether structure 500 has been wrapped around the folded air bag 22, it has the box-like configuration in which it is shown separately in FIG. 13. An inlet opening 502 in the tether structure 500 is then aligned with the inlet opening 172 in the air bag 22. A plurality of apertures 504 in the tether structure 500 are likewise aligned with the apertures 174 in the air bag 22. The apertures 504 in the tether structure 500 are thus located so as to receive the mounting studs 150 (FIG. 6) on the retainer 134.

When the air bag 22 is inflated, as described above, it moves forcefully outward against the tether structure 500. A pair of stress risers 506 in the tether structure 500 then rupture under stress induced by the inflation fluid pressure in the air bag 22. Preferably, the tether structure 500 is formed of a woven fabric material which is the same or similar to the woven fabric material of which the air bag 22 is formed. Alternatively, the tether structure 500 may be formed of any other suitable material known in the art, such as a plastic material.

From the above description of the invention, those skilled in the art will perceive improvements, changes and modifications. For example, each cover 30 in the preferred embodiments of the present invention has two generally rectangular deployment door panels 32 and 34 of differing sizes, but the number, shapes, and/or sizes of such deployment door panels could vary from those described above. Additionally, vehicle name labels or the like can be mounted in or on the covers 30. The outer cover parts 58 would still be continuous bodies of molded plastic material which function to conceal the inflators 20, the air bags 22, and the armatures 40, 260, and 414 from view, as described above. Such improvements, changes and modifications within the skill of the art are intended to be covered by the appended claims.

Having described the invention, the following is claimed:

1. Apparatus for use with a vehicle steering column, said apparatus comprising:

a steering wheel unit comprising a plurality of parts which are interconnected separately from the steering column, said parts including a vehicle steering wheel structure, an inflatable vehicle occupant restraint, an inflator housing, and cover means for covering said restraint and said inflator housing on said steering wheel structure;

said steering wheel structure comprising a rim, at least one spoke, and a hub plate, said hub plate comprising means for supporting said rim and said spoke for rotation about an axis, said hub plate further comprising reaction plate means for supporting said inflator housing on said steering wheel structure;

said cover means comprising inner and outer cover parts which respectively include inner and outer deployment door layers extending over said restraint, each of said cover parts being connected directly to said steering wheel structure.

2. Apparatus as defined in claim 1 wherein said inner cover part has a connector portion projecting away from said outer cover part, said connector portion of said inner cover part being fastened to said steering wheel structure.

3. Apparatus as defined in claim 2 wherein said connector portion of said inner cover part has a non-woven structure, said inner deployment door layer having a woven structure.

4. Apparatus as defined in claim 2 wherein said inflator housing has a mounting portion, said parts of said steering wheel unit further including a retainer extending around said inflator housing and fasteners which fasten said retainer to said reaction plate means, said restraint and said mounting portion of said inflator housing being clamped between said retainer and said reaction plate means.

5. Apparatus as defined in claim 4 wherein said fasteners also fasten said connector portion of said inner cover part to said hub plate.

6. Apparatus as defined in claim 5 wherein said connector portion of said inner cover part is one of a pair of pivotal connector flaps, each of said connector flaps having a pair of apertures for receiving a corresponding pair of said fasteners.

7. Apparatus as defined in claim 5 wherein said hub plate has first and second axially opposite sides, said retainer, said restraint, and said mounting portion of said inflator housing being fastened to said reaction plate means on said first side of said hub plate, said connector portion of said inner cover part being fastened to said reaction plate means on said second side of said hub plate.

8. Apparatus as defined in claim 1 wherein said inner cover part and said steering wheel structure together comprise means for snapping into a locked condition to establish a mechanical interlock between said inner cover part and said steering wheel structure.

9. Apparatus as defined in claim 1 wherein said parts of said steering wheel unit further include a horn actuator between said restraint and said inner cover part.

10. Apparatus as defined in claim 9 wherein said inner cover part has ribs for compressing said horn actuator upon the application of pressure against said outer cover part.

11. Apparatus as defined in claim 1 wherein inner cover part includes means for defining a rupturable boundary of said inner deployment door layer, said rupturable boundary being ruptured by said restraint upon inflation of said restraint.

12. Apparatus as defined in claim 1 wherein said inner cover part has an entirely non-woven structure.

13. Apparatus as defined in claim 12 wherein said inner cover part is a continuous body of thermoplastic material.

14. Apparatus as defined in claim 1 wherein said outer cover part extends over said rim, said spoke, and at least a portion of said inner cover part to conceal said rim, said spoke, and said portion of said inner cover part from view.

15. Apparatus as defined in claim 14 wherein said inner cover part is substantially encapsulated within said outer cover part.

16. Apparatus as defined in claim 14 wherein said outer cover part is a continuous body of thermoplastic material.

17. Apparatus as defined in claim 14 wherein said outer cover part is a continuous body of thermosetting material.

18. Apparatus as defined in claim 1 further comprising a set screw, said steering wheel structure further comprising means for defining a bore for guiding movement of said set screw into engagement with the steering shaft in a direction extending radially inward toward said axis.

19. Apparatus as defined in claim 1 wherein said parts of said steering wheel unit further comprise a tether structure comprising means for holding said restraint in a folded condition.

20. Apparatus for use with a vehicle steering column, said apparatus comprising:

a steering wheel structure comprising a hub plate, a rim, and at least one spoke extending from said hub plate to said rim;

an inflatable vehicle occupant restraint;

an inflator having a housing with a mounting flange;

a retainer extending around said housing;

fastener means for fastening said retainer to said hub plate so as to clamp said restraint and said mounting flange between said retainer and said hub plate; and cover means for covering said restraint on said steering wheel structure, said cover means comprising inner and outer cover parts which respectively include inner and outer deployment door layers extending over said restraint;

said outer cover part being a continuous body of plastic material which extends over said rim, said spoke, and at least a portion of said inner cover part to conceal said rim, said spoke, and said portion of said inner cover part from view;

said inner cover part being a continuous body of plastic material which is bonded to said outer cover part and fastened to said hub plate.

21. Apparatus as defined in claim 20 further comprising a horn actuator between said restraint and said inner cover part, said inner cover part having rib means for compressing said horn actuator upon the application of pressure against said outer cover part.

22. Apparatus as defined in claim 20 wherein said inner cover part includes means for defining a rupturable boundary of said inner deployment door layer, said rupturable boundary being ruptured by said restraint upon inflation of said restraint.

23. Apparatus as defined in claim 20 wherein said inner cover part is fastened to said hub plate by said fastener means.

24. Apparatus as defined in claim 23 wherein said inner cover part has a pair of pivotal connector flaps, said fastener means comprising fasteners extending through apertures in said connector flaps.

25. Apparatus as defined in claim 24 wherein said hub plate has an axis of rotation and first and second axially opposite sides, said retainer, said restraint, and said mounting flange being fastened to said hub plate on said first side of said hub plate, said connector flaps being fastened to said hub plate on said second side of said hub plate.

* * * * *